(12) United States Patent
Kobayashi et al.

(10) Patent No.: US 11,110,865 B2
(45) Date of Patent: Sep. 7, 2021

(54) VEHICLE DISPLAY DEVICE AND VEHICLE DISPLAY SYSTEM

(71) Applicant: JVCKENWOOD Corporation, Yokohama (JP)

(72) Inventors: Manabu Kobayashi, Yokohama (JP); Yuki Wada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 52 days.

(21) Appl. No.: 16/839,093

(22) Filed: Apr. 3, 2020

(65) Prior Publication Data
US 2020/0231093 A1 Jul. 23, 2020

Related U.S. Application Data

(63) Continuation of application No. PCT/JP2018/037069, filed on Oct. 3, 2018.

(30) Foreign Application Priority Data
Nov. 29, 2017 (JP) .............................. JP2017-229416

(51) Int. Cl.
| | |
|---|---|
| *B60R 1/12* | (2006.01) |
| *B60R 1/04* | (2006.01) |
| *B60R 1/08* | (2006.01) |
| *B60R 11/04* | (2006.01) |

(52) U.S. Cl.
CPC ............ *B60R 1/12* (2013.01); *B60R 1/04* (2013.01); *B60R 1/08* (2013.01); *B60R 11/04* (2013.01); *B60R 2001/1215* (2013.01); *B60R 2001/1253* (2013.01); *B60R 2300/20* (2013.01); *B60R 2300/8026* (2013.01)

(58) Field of Classification Search
CPC .... B60R 1/12; B60R 1/04; B60R 1/08; B60R 2001/1215; B60R 2001/1253; B60R 2300/20; B60R 2300/8026
See application file for complete search history.

(56) References Cited

U.S. PATENT DOCUMENTS

| | | | |
|---|---|---|---|
| 2006/0171704 A1* | 8/2006 | Bingle | H04N 5/2254 396/419 |
| 2017/0227187 A1* | 8/2017 | Fritz | B60R 1/1207 |
| 2018/0201193 A1 | 7/2018 | Sakamoto | |

FOREIGN PATENT DOCUMENTS

| | | |
|---|---|---|
| EP | 0450553 | 10/1991 |
| JP | 06-148562 | 5/1994 |
| JP | 11052485 | 2/1999 |

(Continued)

OTHER PUBLICATIONS

International Search Report and Written Opinion for International Patent Application No. PCT/JP2018/037069 dated Nov. 20, 2018, 12 pages.

*Primary Examiner* — Anabel Ton
(74) *Attorney, Agent, or Firm* — Amin, Turocy & Watson, LLP

(57) ABSTRACT

A vehicle display device includes a display configured to display a video; a first mirror configured to reflect the video displayed in the display; and a second mirror configured to reflect the video reflected on the first mirror, wherein a distance from eye point of occupant of vehicle to a reflecting image formed by the second mirror is optically extended such that it becomes longer than a distance from the eye point of the occupant to a display surface of the display.

3 Claims, 9 Drawing Sheets

(56) References Cited

FOREIGN PATENT DOCUMENTS

| | | |
|---|---|---|
| JP | 2001-183179 | 7/2001 |
| JP | 2009-120080 | 6/2009 |
| JP | 2015-069081 | 4/2015 |
| JP | 2017-024597 | 2/2017 |
| WO | 00/74380 | 12/2000 |
| WO | 2008/050842 | 5/2008 |

* cited by examiner

VIRTUAL IMAGE

VIRTUAL IMAGE

VEHICLE DISPLAY DEVICE AND VEHICLE DISPLAY SYSTEM

CROSS-REFERENCE TO RELATED APPLICATIONS

This application is a Continuation of PCT International Application No. PCT/JP2018/037069 filed in Japan on Oct. 3, 2018, which claims priority to and incorporates by reference the entire contents of Japanese Patent Application No. 2017-229416 filed in Japan on Nov. 29, 2017.

FIELD

The present application relates to a vehicle display device and a vehicle display system.

BACKGROUND

As a substitute for a conventional optical rearview mirror that reflects a rear view of a vehicle and enables an occupant of the vehicle to visually confirm the rear view of the vehicle, a technology is known that is related to an electronic mirror which displays, in a display, video captured by a camera for capturing the rear view of the vehicle and enables the occupant of the vehicle to visually confirm the rear view of the vehicle (for example, see Japanese Patent No. 5286750).

SUMMARY

In an identical manner to a conventional optical rearview mirror, the electronic mirror is disposed in an upper middle portion at a front of the vehicle interior. Hence, it is desirable that the electronic mirror is downsized in order to avoid blocking field of view on the front side. Moreover, in order to enhance visibility, it is desirable to suppress occurrence of distortion.

A vehicle display device and a vehicle display system are disclosed.

According to one aspect, there is provided a vehicle display device comprising: a display configured to display a video; a first mirror of a concave mirror having a reflecting surface formed in a concave shape configured to reflect the video displayed in the display; and a second mirror of a concave mirror having a reflecting surface formed in a concave shape configured to reflect the video reflected on the first mirror, wherein a display surface of the display is positioned within a composite focal length of the first mirror and the second mirror; a distance from eye point of occupant of vehicle to a reflecting image formed by the second mirror is optically extended such that it becomes longer than a distance from the eye point of the occupant to a display surface of the display; and R1 and R2 satisfy $1.1 < R2/R1 < 2$ wherein R1 represents a curvature radius of the reflecting surface of the first mirror and R2 represents a curvature radius of the reflecting surface of the second mirror; and at least one of conditions: R1 and R2 satisfy $1.1 < R2/R1 < 2$ wherein R1 represents a curvature radius of the reflecting surface (61) of the first mirror and R2 represents a curvature radius of the reflecting surface of the second mirror; R1 satisfies $300\ \text{mm} \leq R1 \leq 600\ \text{mm}$; and Yv and Yp satisfy $1 < Yv/Yp < 10$ wherein Yv represents a magnitude in a vertical direction of the video that is visually confirmed by the occupant and Yp represents a magnitude in a height direction of the video, corresponding to the vertical direction of the virtual image displayed on the display surface; is satisfied.

According to one aspect, there is provided a vehicle display system comprising: the vehicle display device described above; a rear camera configured to capture a rear view of the vehicle; and a controller configured to acquire a video captured by the rear camera and displays the captured video in the display.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Exemplary embodiments of a vehicle display system 1 according to the present application are described below in detail with reference to the accompanying drawings. However, the present application is not limited by the embodiments described below.

In the following explanation, a longitudinal direction represents a travelling direction of the vehicle in a straight line. A front side in the travelling direction is treated as a "front" of the longitudinal direction, and a rear side in the travelling direction is treated as a "rear" of the longitudinal direction. The lateral direction represents a direction that is horizontally orthogonal to the longitudinal direction. With reference to the direction toward the "front" of the longitudinal direction, a left-hand side represents the "left" and a right-hand side represents the "right". A vertical direction represents a direction that is orthogonal to the longitudinal direction and the lateral direction. Thus, the longitudinal direction, the lateral direction, and the vertical direction are three-dimensionally orthogonal to each other.

Figure 1:
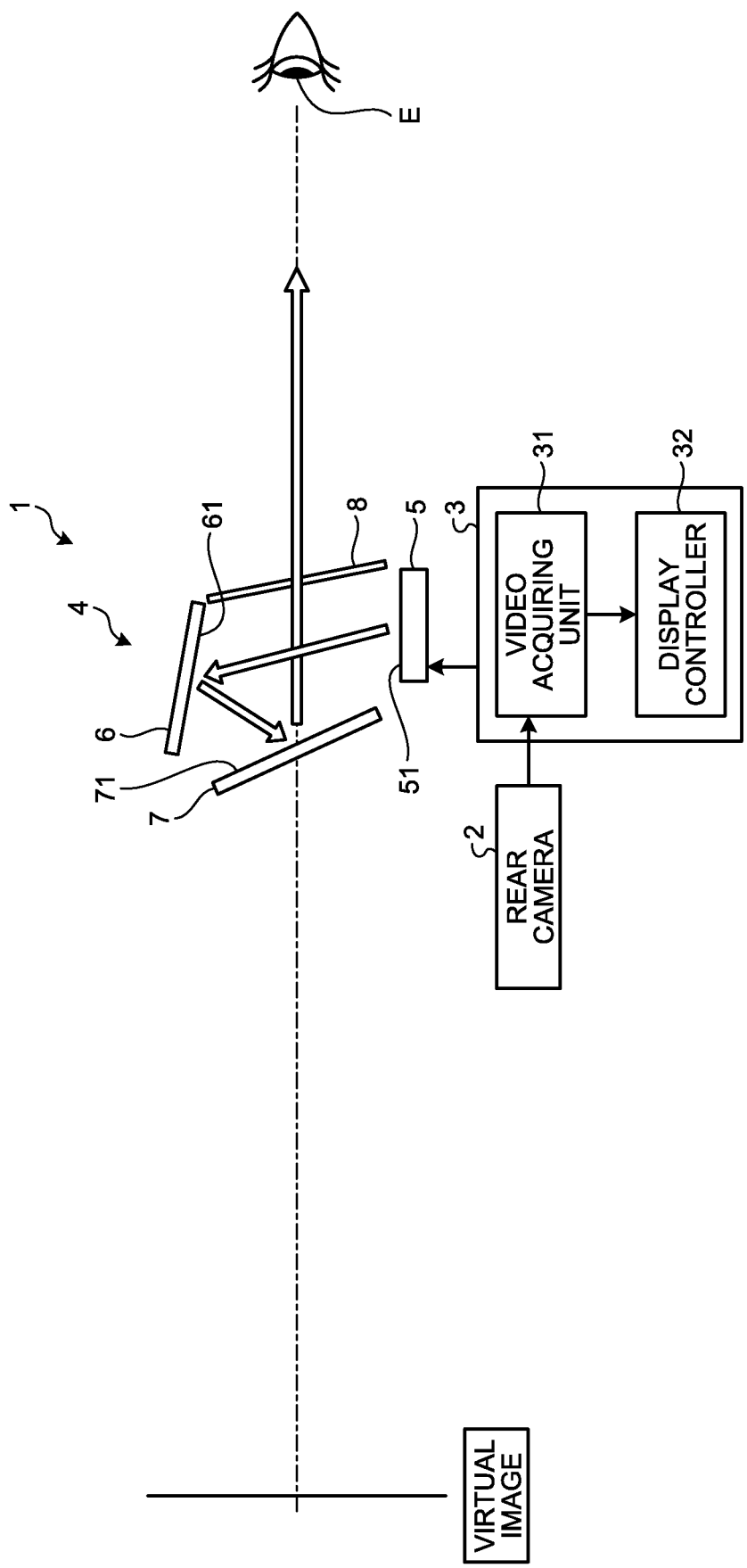
FIG. 1 is an overall diagram illustrating an exemplary configuration of a vehicle display device according to embodiments.
Figure 2:
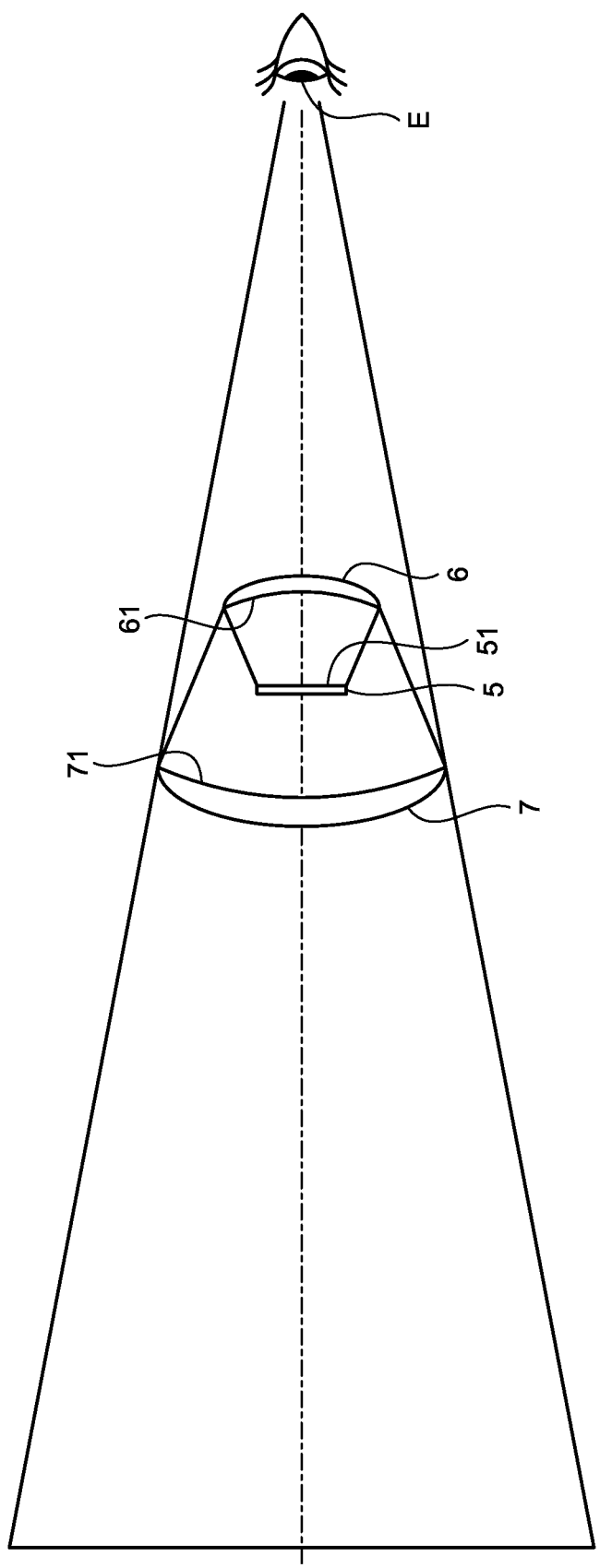
FIG. 2 is an overall diagram illustrating the exemplary configuration of the vehicle display device according to the embodiments.
Figure 3:
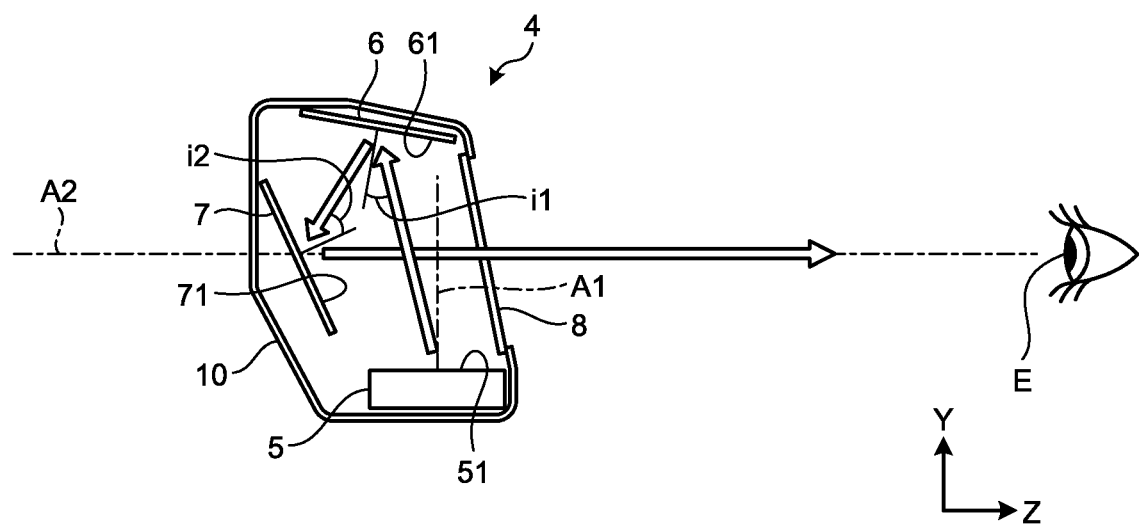
FIG. 3 is a lateral cross-sectional view illustrating the exemplary configuration of the vehicle display device according to the embodiments.

The vehicle display system 1 is installed in a vehicle and displays a rear view of the vehicle. FIG. 1 is an overall diagram illustrating an exemplary configuration of the vehicle display device according to the embodiments. FIG. 2 is an overall diagram illustrating the exemplary configuration of the vehicle display device according to the embodiments. FIG. 3 is a lateral cross-sectional view illustrating the exemplary configuration of the vehicle display device according to the embodiments.

As illustrated in FIGS. 1 to 3, the vehicle display system 1 is, what is called, an electronic rearview mirror. The vehicle display system 1 includes a rear camera 2, a controller 3, and a vehicle display device 4. In the embodiments, the driver is assumed to be the occupant of the vehicle.

The rear camera 2 is disposed at the rear of the vehicle and takes images of the rear side of the vehicle. The rear camera 2 takes images of a range that includes the confirmation range for the vehicle display device 4. Moreover, the rear camera 2 acquires images of a range including areas not displayed in the vehicle display device 4. The rear camera 2 has a horizontal angle of view in the range of, for example, 30° to 60° and has a vertical angle of view in the range of, for example, 5° to 20°. The rear camera 2 outputs video data to a video acquiring unit 31 of the controller 3.

The controller 3 is an arithmetic processor configured using, for example, a CPU (Central Processing Unit). The controller 3 executes commands written in programs is stored in a memory unit (not illustrated). The controller 3 includes the video acquiring unit 31 and a display controller 32.

The video acquiring unit 31 acquires video by capturing the rear view of the vehicle. The video data acquired by the video acquiring unit 31 represents, for example, video data in which images are continuously captured at a rate of 60 frames per second. In the embodiments, the video acquiring unit 31 acquires the video data output by the rear camera 2. Then, the video acquiring unit 31 clips, from the video data, a range to be displayed in the vehicle display device 4. The range for clipping the video data is stored in advance in the memory unit. The clipped range includes a range over which the driver performs visual confirmation with a conventional optical rearview mirror. Subsequently, the video acquiring unit 31 outputs the clipped video data as video signals to the display controller 32.

The display controller 32 displays the video signals output from the video acquiring unit 31 in the vehicle display device 4.

The vehicle display device 4 enables the driver to visually confirm the rear view of the vehicle. In the embodiments, the vehicle display device 4 can be switched as a display for visually confirming a virtual image and as a display used as an optical rearview mirror. In the embodiments, the vehicle display device 4 is disposed in the upper middle portion of the front side of the vehicle interior. The vehicle display device 4 includes a display (a display device) 5, a first concave mirror (a first mirror) 6, a second concave mirror (a second mirror) 7, a half mirror 8, and a housing 10 for housing the constituent elements. In the vehicle display device 4, a distance from an eye point E of the driver to a reflected image formed due to the second concave mirror 7, that is, a virtual image distance from the eye point E of the driver to the virtual image is optically extended such that it becomes longer than a distance from the eye point E of the driver to a display surface 51 of the display 5. In the embodiments, the vehicle display device 4 is set to have the virtual image distance equal to or greater than approximately 800 mm.

Herein, the virtual image distance represents one of prerequisites. The virtual image distance implies a condition for reducing stress on the eyes of the driver on visually confirming the virtual image. The virtual image distance is set to such a distance by which the visual image is easily viewable to the driver who is visually confirming several tens of meters in the front side while driving.

Based on the video signals output from the display controller 32, the display 5 displays the video of the rear view of the vehicle. Examples of the display 5 include a liquid crystal display (LCD) or an organic electro-luminescence (Organic EL) display. The display 5 includes the display surface 51 of the flat type.

The display surface 51 has a landscape-oriented rectangular shape. In the embodiments, the display surface 51 has a width of, for example, 180 mm in a long-side direction corresponding to the horizontal direction of a valid area, and has a width of, for example, 45 mm in the short-side direction corresponding to the vertical direction. When the vehicle display device 4 is attached to the vehicle, the display surface 51 is disposed to be oriented upward. Moreover, the display surface 51 is positioned to face a reflecting surface 61 of the first concave mirror 6.

An optical axis A1 of the display 5 extends from a center of the display surface 51 in a direction orthogonal to the display surface 51. In the embodiments, when a video is being displayed, a central ray of the display 5 is emitted at an angle of 14° in a YZ plane in FIG. 3, for example, and falls on the first concave mirror 6. In other words, in the embodiments, the display surface 51 is disposed to be inclined with respect to the central ray falling on the first concave mirror 6.

Moreover, the display surface 51 of the display 5 is positioned within a focal length of the first concave mirror 6. Furthermore, the display surface 51 of the display 5 is positioned within a focal length of the second concave mirror 7. Moreover, the display surface 51 of the display 5 is positioned within a composite focal length of the first concave mirror 6 and the second concave mirror 7.

The first concave mirror 6 reflects video displayed in the display 5. More specifically, the first concave mirror 6 reflects an incident light coming from the display 5 toward the second concave mirror 7. The first concave mirror 6 has a reflecting surface 61 formed in a concave shape for reflecting the video. Moreover, the first concave mirror 6 is bent in a concave manner toward a lower front side. Furthermore, the first concave mirror 6 is disposed above the display 5. The reflecting surface 61 of the first concave mirror 6 is positioned to face the display surface 51 of the display 5 and a reflecting surface 71 of the second concave mirror 7.

The second concave mirror 7 reflects light displayed in the display 5 and reflected from the first concave mirror 6.

More specifically, the second concave mirror 7 reflects the light reflected from the first concave mirror 6 toward the half mirror 8. The second concave mirror 7 has the reflecting surface 71 formed in a concave shape for reflecting the video. Moreover, the second concave mirror 7 is bent in a concave manner toward an upper rear side. When the vehicle display device 4 is attached to the vehicle, the second concave mirror 7 is disposed on the front side compared to the half mirror 8. The reflecting surface 71 of the second concave mirror 7 is positioned to face the reflecting surface 61 of the first concave mirror 6 and the half mirror 8.

The half mirror 8 transmits the video reflected from the first concave mirror 6 and the second concave mirror 7, and reflects incident light from an opposite side of the second concave mirror 7. The half mirror 8 is formed to have a planar shape. Moreover, the half mirror 8 is set to have a transmittance of 50% of the incident light. In other words, the half mirror 8 transmits 50% of the incident light and reflects the remaining 50% of the incident light. The half mirror 8 is positioned to face the reflecting surface 71 of the second concave mirror 7. When the vehicle display device 4 is attached to the vehicle, the half mirror 8 is disposed on the rear side compared to the display 5, the first concave mirror 6, and the second concave mirror 7. Moreover, when the vehicle display device 4 is attached to the vehicle, the half mirror 8 is disposed opposite to the driver.

The housing 10 is formed to have a box shape with an opening. In an internal space of the housing 10 are assembled the display 5, the first concave mirror 6, and the second concave mirror 7. The opening of the housing 10 is covered by the half mirror 8. The housing 10 configured in this manner is attached to the vehicle. In the embodiments, the housing 10 is positioned at a position which is looked upward by the driver.

Meanwhile, it is desirable that the vehicle display device 4 satisfies at least one of conditions (i) to (v) explained below.

Condition (i)

If R1 represents a curvature radius of the reflecting surface 61 of the first concave mirror 6 and if R2 represents a curvature radius of the reflecting surface 71 of the second concave mirror 7, then R1 and R2 satisfy Equation 1 given below.

$$1.1 < R2/R1 < 2 \quad (1)$$

The condition (i) is set to define a ratio of the curvature radius of the first concave mirror 6 to the curvature radius of the second concave mirror 7. When the condition (i) gets satisfied, it becomes possible to successfully correct optical distortion in the virtual image that is visually confirmed by the driver.

Figure 4:
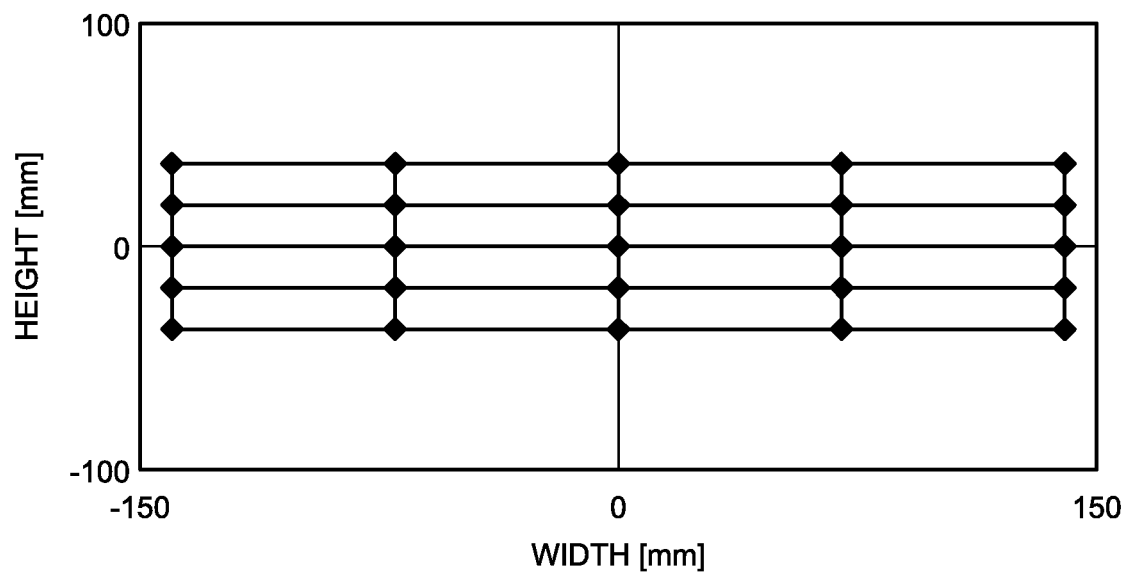
FIG. 4 is a diagram illustrating an example of a virtual image that is visually confirmed by a driver with the vehicle display device according to the embodiments.
Figure 5:
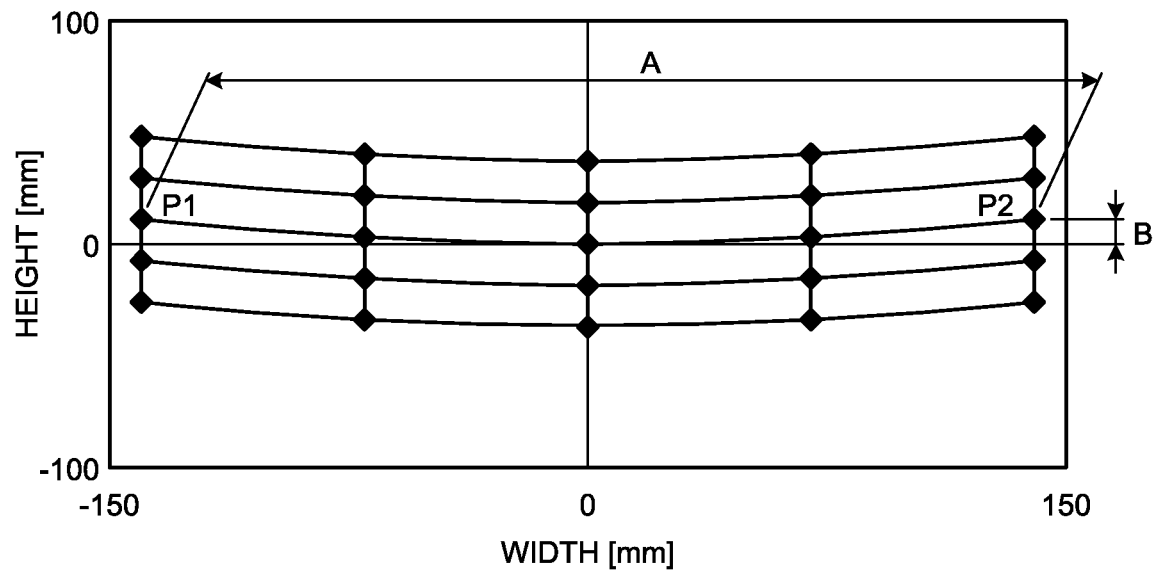
FIG. 5 is a diagram illustrating another example of the virtual image that is visually confirmed by the driver with the vehicle display device according to the embodiments.
Figure 6:
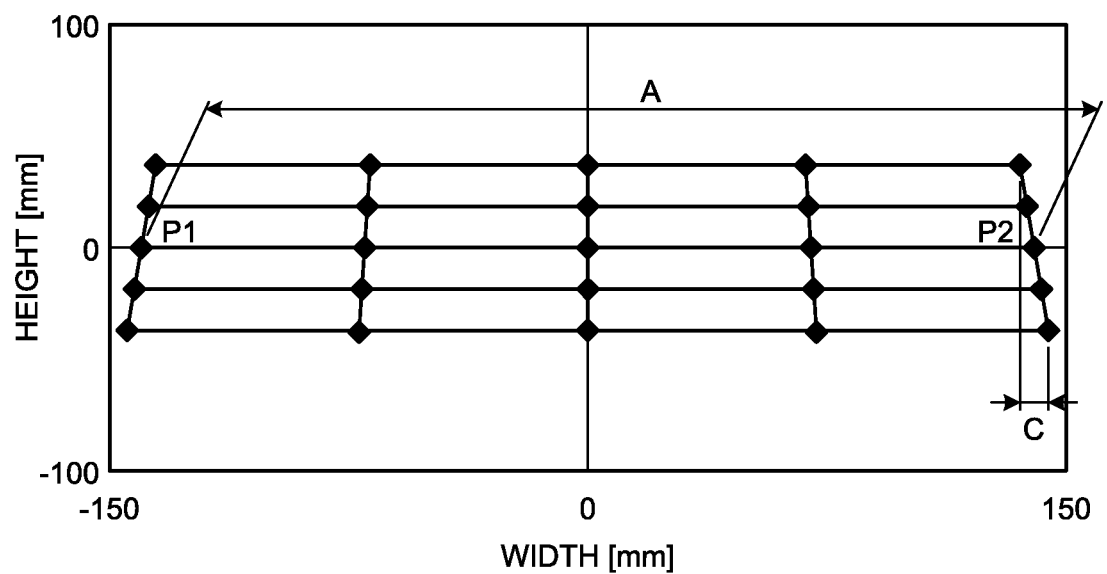
FIG. 6 is a diagram illustrating still another example of the virtual image that is visually confirmed by the driver with the vehicle display device according to the embodiments.

The following explanation with reference to FIGS. 4 to 6 is given about the virtual image that is visually confirmed by the driver. FIG. 4 is a diagram illustrating an example of the virtual image that is visually confirmed by the driver with the vehicle display device according to the embodiments. FIG. 5 is a diagram illustrating another example of the virtual image that is visually confirmed by the driver with the vehicle display device according to the embodiments. FIG. 6 is a diagram illustrating still another example of the virtual image that is visually confirmed by the driver with the vehicle display device according to the embodiments. Herein, the explanation is given under the assumption that a rectangular video is displayed on the display surface 51 of the display 5.

As illustrated in FIG. 4, the virtual image that does not have any optical distortion is rectangular in shape in an identical manner to the video displayed on the display surface 51 of the display 5.

As illustrated in FIG. 5, when R2/R1 falls below the lower limit of the condition (i), there occurs an increase in the curvature distortion. That results in a sectorial distortion shape with a center of the circular arc being located on the upper side, and it becomes difficult to correct the optical distortion. The curvature distortion is calculated using (B/A)×100[%]. As illustrated in FIG. 5, when the shape of the distortion is a shape in which the center of the circular arc is located on the upper side, the curvature distortion becomes a positive value. On the other hand, when the shape of the distortion is a shape in which the center of the circular arc is located on the lower side, the curvature distortion becomes a negative value.

As illustrated in FIG. 6, when R2/R1 exceeds the upper limit of the condition (i), there occurs an increase in the trapezoidal distortion. In that case, the length of bases of the trapezoid satisfies a condition (lower base)<(upper base). In order to correct the trapezoidal distortion, an installation direction of the display 5 needs to be adjusted by deviating from a condition (v) that represents one of the prerequisites, thereby making it difficult to achieve downsizing of the vehicle display device 4. The trapezoidal distortion is calculated using (C/A)×100[%]. As illustrated in FIG. 6, when the shape of the distortion is a shape in which the length of the upper base and the length of the lower base of the trapezoid satisfy (lower base)<(upper base), the trapezoidal distortion becomes a positive value. On the other hand, when the shape of the distortion is a shape in which the length of the upper base and the length of the lower base of the trapezoid satisfy (upper base)<(lower base), the trapezoidal distortion becomes a negative value.

Condition (ii)

If i1 represents an incidence angle of the central ray from the display 5 to the first concave mirror 6 and if i2 represents an incidence angle of the central ray from the first concave mirror 6 to the second concave mirror 7, the incidence angles i1 and i2 satisfy Equation 2 given below.

$$30° \leq i1 + i2 \leq 70° \quad (2)$$

Moreover, it is desirable that the incidence angles i1 and i2 satisfy Equation 3 given below.

$$45° \leq i1 + i2 \leq 59° \quad (3)$$

The condition (ii) is set to define a bending configuration for a light path formed due to the first concave mirror 6 and the second concave mirror 7. As a result of satisfying the condition (ii), the entire vehicle display device 4, that is, the housing 10 can be downsized and deterioration in the image quality due to the inclined incidence on the first concave mirror 6 and the second concave mirror 7 can be suppressed. When i1+i2 falls below the lower limit of the condition (ii), it becomes difficult to achieve downsizing of the vehicle display device 4. Moreover, due to a mirror arrangement for securing pencil of rays from the first concave mirror 6 and the second concave mirror 7, a volume of the housing 10 is increased. On the other hand, when i2+i3 exceeds the upper limit of the condition (ii), aberration due to the first concave mirror 6 and the second concave mirror 7 is increased.

Condition (iii)

The curvature radius R1 of the reflecting surface 61 of the first concave mirror 6 satisfies Equation 4 given below.

$$300 \text{ mm} \leq R1 \leq 600 \text{ mm} \quad (4)$$

Moreover, it is desirable that the curvature radius R1 of the reflecting surface 61 of the first concave mirror 6 satisfies Equation 5 given below.

$$360 \text{ mm } R1 \leq 470 \text{ mm} \quad (5)$$

The condition (iii) is set to define the curvature radius of the first concave mirror 6. When the conditions (iii) and (iv) are satisfied, the aberration can be successfully corrected while achieving downsizing of the entire optical system. If the curvature radius R1 falls below the lower limit of the condition (iii), then the focal length of the entire optical system becomes smaller and the aberration increases, as well as fluctuation in the image quality due to error of the optical components is increased. On the other hand, if the curvature radius R1 exceeds the upper limit of the condition (iii), it makes the condition (i) to fall below the lower limit and the sectorial distortion shape with the center of the circular arc being located on the upper side is increased. Moreover, since the focal length of the entire optical system increases, it becomes difficult to achieve downsizing of the housing 10.

Condition (iv)

If Yv represents a magnitude in a vertical direction of the virtual image that is visually confirmed by the driver and if Yp represents a magnitude in a height direction of the video, corresponding to the vertical direction of the virtual image, displayed on the display surface 51 of the display 5, then the magnitudes Yv and Yp satisfy Equation 6 given below.

$$1 < Yv/Yp < 10 \quad (6)$$

Moreover, it is desirable that the magnitudes Yv and Yp satisfy Equation 7 given below.

$$2 < Yv/Yp < 5 \quad (7)$$

The condition (iv) is set to define a magnification of the video. When the condition (iv) is satisfied, the aberration can be successfully corrected while achieving downsizing of the entire optical system. When Yv/Yp falls below the lower limit of the condition (iv), a sufficiently magnified video cannot be obtained. In other words, a virtual image cannot be obtained. When Yv/Yp exceeds the upper limit of the condition (iv), the aberration of the virtual image increases and it particularly becomes difficult to correct the distortion.

Condition (v)

The display surface 51 of the display 5 is disposed to be parallel to an optical axis A2 joining the eye point E of the driver and the virtual image.

The condition (v) is set to define a installation direction of the display 5 in the housing 10. Moreover, the condition (v) represents a prerequisite for achieving downsizing of the housing 10. When the vehicle display system 1 is installed as a substitute for a conventional optical rearview mirror, field of view on the front side may get blocked due to an increase in a size of the housing 10. Hence, it is desirable to downsize the housing 10.

The condition (v), that is, the display surface 51 of the display 5 is so disposed that a direction of extension of the short side of the rectangular display surface 51 is parallel to the optical axis A2 joining the eye point E of the driver and the virtual image. Thus, the short-side direction of the rectangular display surface 51 of the display 5 is parallel to the optical axis A2 joining the eye point E and the virtual image. Herein, the short-side direction is assumed to be a direction from a side of the opening of the housing 10 toward the second concave mirror 7. Thus, the display surface 51 of the display 5 is disposed to be oriented upward and along the direction parallel to the optical axis A2 running from the second concave mirror 7 toward the eye point E of the driver, and is disposed to be inclined with respect to the central ray that falls on the first concave mirror 6 from the display surface 51 of the display 5.

In the vehicle display device 4 configured in the manner described above, by varying the angle with respect to the vertical direction, it becomes possible to switch it as a display for visually confirming a virtual image and as a display used as an optical rearview mirror. More specifically, on visually confirming the virtual image with the vehicle display system 1, the driver can visually confirm, as the virtual image, the video in the display 5 obtained as a result of reflection from the second concave mirror 7 and transmission through the half mirror 8. Since the half mirror 8 is oriented toward the upper rear side, the reflected video from the half mirror 8 as viewed by the driver is located in the upper rear side inside the vehicle interior, and thus there is less influence on a visibility of the video displayed in the display 5. At that time, the driver can visually confirm the virtual image based on the video displayed in the display 5. On using the vehicle display system 1 as an optical rearview mirror, by varying an angle of the housing 10 of the vehicle display device 4 compared to that on visually confirming the virtual image, the half mirror 8 reflects the incident light from the rear side of the vehicle. At that time, in an identical manner to an optical rearview mirror, the rear view of the vehicle is displayed therein.

Given below is the explanation of a display method and operations for displaying a virtual image in the vehicle display system 1. Firstly, the rear camera 2 outputs the captured video data of the rear view of the vehicle obtained to the video acquiring unit 31 of the controller 3. Thus, the video acquiring unit 31 acquires the video data from the rear camera 2 and outputs it to the display controller 32. Then, the display controller 32 outputs the video data as video signals to the display 5 of the vehicle display device 4.

Subsequently, the display 5 displays, on the display surface 51, the video of the rear view of the vehicle based on the video signals. The display 5 in which the video is displayed emits light. The emitted light then falls on the first concave mirror 6. Subsequently, the incident light on the first concave mirror 6 is reflected toward the second concave mirror 7. Then, the light reflected on the first concave mirror 6 falls on the second concave mirror 7. Subsequently, the incident light on the second concave mirror 7 is reflected toward the half mirror 8. Then, the light reflected from the second concave mirror 7 falls on the half mirror 8. Subsequently, the incident light on the half mirror 8 passes through the half mirror 8 and reaches the driver. Thus, the driver visually confirms the virtual image.

First Embodiment

As illustrated in Table 1, the curvature radius R1 of the reflecting surface 61 of the first concave mirror 6 is equal to 410.747 mm, the curvature radius R2 of the reflecting surface 71 of the second concave mirror 7 is equal to 611.761 mm, the incidence angle i1 is equal to 24.5°, and the incidence angle i2 is equal to 27.6°.

TABLE 1

| | Curvature radius of each face R [mm] | Coordinates of central ray in each face | | | Incidence angle [deg] of central ray in each face |
|---|---|---|---|---|---|
| | | X [mm] | Y [mm] | Z [mm] | |
| Display device | ∞ | 0 | −32.397 | −455.5000 | — |
| First concave mirror | 410.747 | 0 | 38.430 | −473.291 | 24.5 |
| Second concave mirror | 611.761 | 0 | 0 | −500.000 | 27.6 |
| Eye Point | ∞ | 0 | 0 | 0 | 0 |
| Virtual image | ∞ | 0 | 0 | −836.028 | 0 |

As illustrated in Table 2, if i1+i2 is equal to 52.1, if R2/R1 is equal to 1.49, and if Yv/Yp is equal to 3.71, then the distance from the virtual image to the eye point E becomes equal to 836.028 mm.

TABLE 2

| i1 + i2 | 52.1 |
|---|---|
| R2/R1 | 1.49 |
| Yv/Yp | 3.71 |
| R1 | 410.747 |
| Virtual image to EyePoint | 836.028 |

Figure 7:
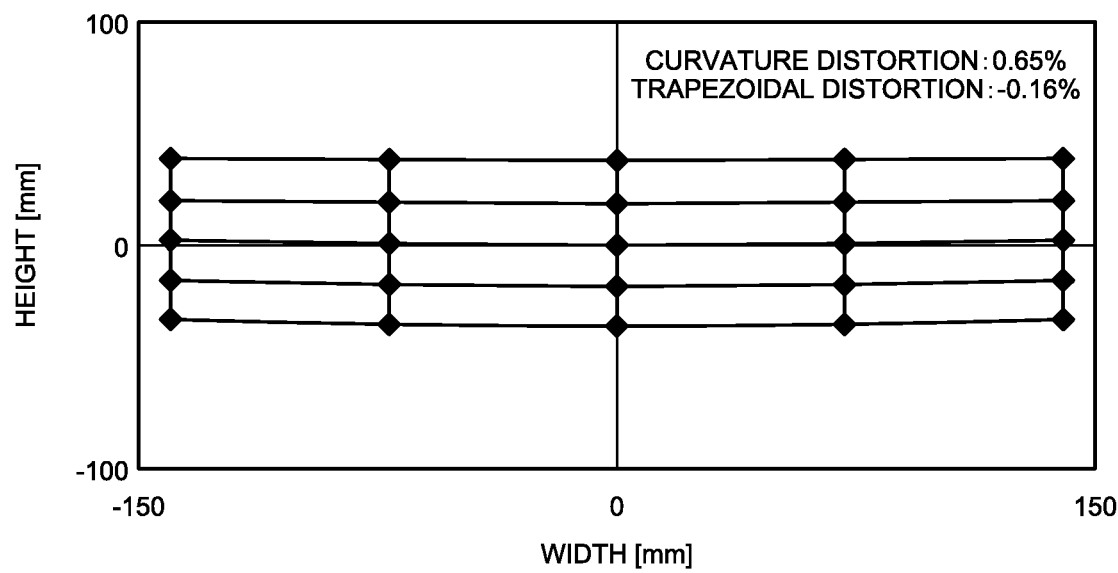
FIG. 7 is a diagram illustrating an example of the virtual image that is visually confirmed by the driver according to a first embodiment.

The following explanation with reference to FIG. 7 is given about the distortion according to a first embodiment. FIG. 7 is a diagram illustrating an example of the virtual image that is visually confirmed by the driver according to the first embodiment. In this case, the curvature distortion is equal to 0.65% and the trapezoidal distortion is equal to −0.16%.

Second Embodiment

As illustrated in Table 3, the curvature radius R1 of the reflecting surface 61 of the first concave mirror 6 is equal to 420.000 mm, the curvature radius R2 of the reflecting surface 71 of the second concave mirror 7 is equal to 600.000 mm, the incidence angle i1 is equal to 24.5°, and the incidence angle i2 is equal to 27.6°.

TABLE 3

| | Curvature radius of each face R [mm] | Coordinates of central ray in each face | | | Incidence angle [deg] of central ray in each face |
|---|---|---|---|---|---|
| | | X [mm] | Y [mm] | Z [mm] | |
| Display device | ∞ | 0 | −32.397 | −455.500 | — |
| First concave mirror | 420.000 | 0 | 38.430 | −473.291 | 24.5 |
| Second concave mirror | 600.000 | 0 | 0 | −500.00 | 27.6 |
| Eye Point | ∞ | 0 | 0 | 0 | 0 |
| Virtual image | ∞ | 0 | 0 | −828.606 | 0 |

As illustrated in Table 4, if i1+i2 is equal to 52.1, if R2/R1 is equal to 1.43, and if Yv/Yp is equal to 3.71, then the distance from the virtual image to the eye point E is equal to 828.606 mm.

TABLE 4

| i1 + i2 | 52.1 |
|---|---|
| R2/R1 | 1.43 |
| Yv/Yp | 3.71 |
| R1 | 420 |
| Virtual image to EyePoint | 828.606 |

Figure 8:
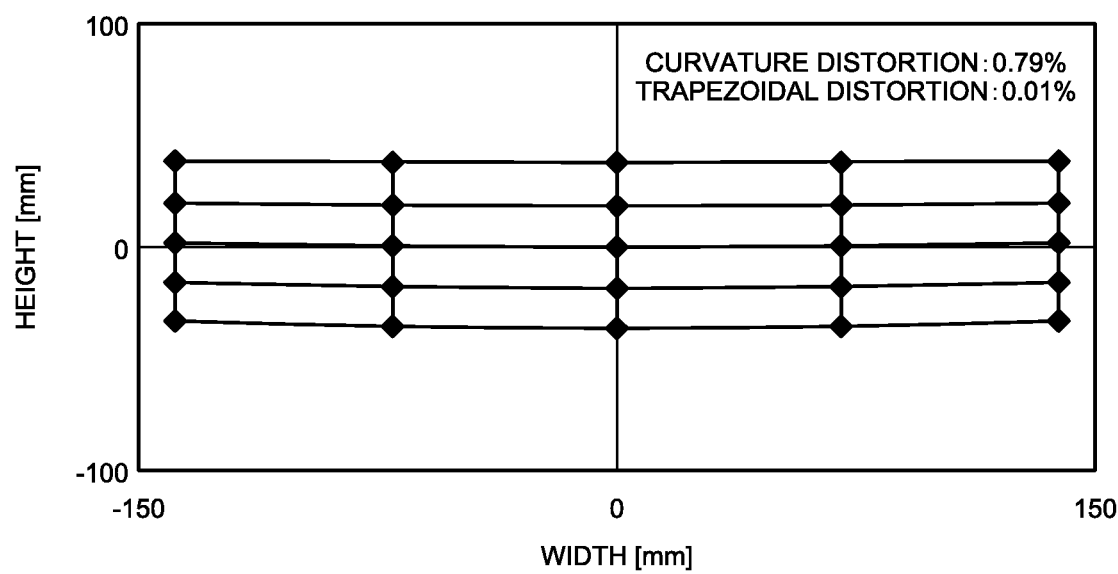
FIG. 8 is a diagram illustrating an example of the virtual image that is visually confirmed by the driver according to a second embodiment.

The following explanation with reference to FIG. 8 is given about the distortion according to a second embodiment. FIG. 8 is a diagram illustrating an example of the virtual image that is visually confirmed by the driver according to the second embodiment. In this case, the curvature distortion is equal to 0.79% and the trapezoidal distortion is equal to 0.01%.

Third Embodiment

As illustrated in Table 5, the curvature radius R1 of the reflecting surface 61 of the first concave mirror 6 is equal to 450.000 mm, the curvature radius R2 of the reflecting surface 71 of the second concave mirror 7 is equal to 568.130 mm, the incidence angle i1 is equal to 24.5°, and the incidence angle i2 is equal to 27.6°.

TABLE 5

| | Curvature radius of each face R [mm] | Coordinates of central ray in each face | | | Incidence angle [deg] of central ray in each face |
|---|---|---|---|---|---|
| | | X [mm] | Y [mm] | Z [mm] | |
| Display device | ∞ | 0 | −32.397 | −455.500 | — |
| First concave mirror | 450.000 | 0 | 38.430 | −473.291 | 24.5 |
| Second concave mirror | 568.130 | 0 | 0 | −500.00 | 27.6 |
| Eye Point | ∞ | 0 | 0 | 0 | 0 |
| Virtual image | ∞ | 0 | 0 | −840.755 | 0 |

As illustrated in Table 6, if i1+i2 is equal to 52.1, if R2/R1 is equal to 1.26, and if Yv/Yp is equal to 3.71, then the distance from the virtual image to the eye point E is equal to 840.755 mm.

TABLE 6

| i1 + i2 | 52.1 |
|---|---|
| R2/R1 | 1.26 |
| Yv/Yp | 3.71 |
| R1 | 450 |
| Virtual image to EyePoint | 840.755 |

Figure 9:
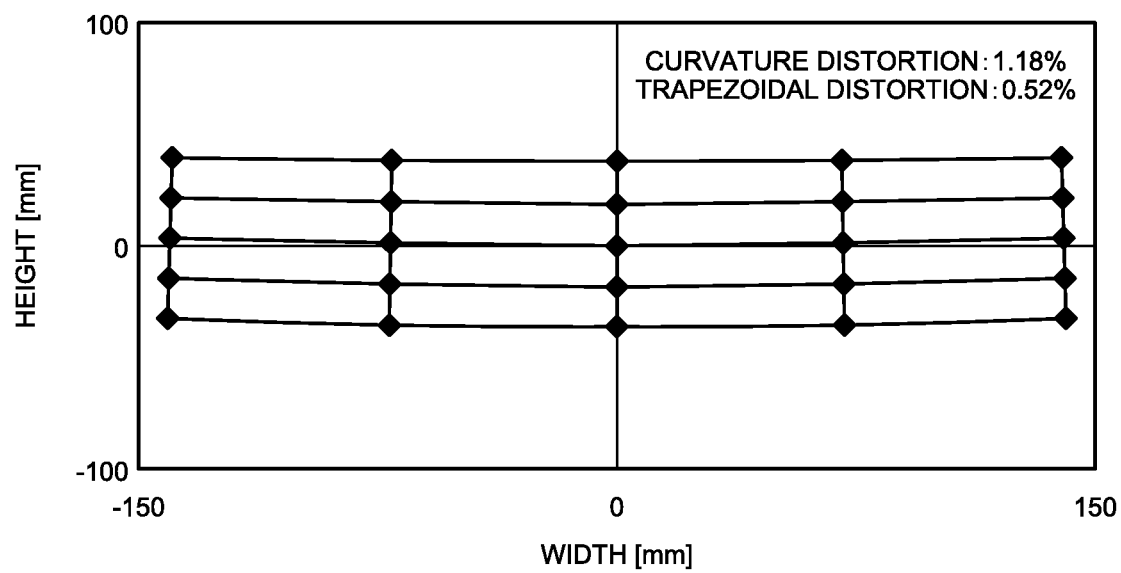
FIG. 9 is a diagram illustrating an example of the virtual image that is visually confirmed by the driver according to a third embodiment.

The following explanation with reference to FIG. 9 is given about the distortion according to a third embodiment. FIG. 9 is a diagram illustrating an example of the virtual image that is visually confirmed by the driver according to the third embodiment. In this case, the curvature distortion is equal to 1.18% and the trapezoidal distortion is equal to 0.52%.

Fourth Embodiment

As illustrated in Table 7, the curvature radius R1 of the reflecting surface 61 of the first concave mirror 6 is equal to 370.000 mm, the curvature radius R2 of the reflecting surface 71 of the second concave mirror 7 is equal to 679.810 mm, the incidence angle i1 is equal to 24.5°, and the incidence angle i2 is equal to 27.6°.

TABLE 7

| Curvature radius of each face R [mm] | Coordinates of central ray in each face | | | Incidence angle [deg] of central ray in each face |
|---|---|---|---|---|
| | X [mm] | Y [mm] | Z [mm] | |
| Display device ∞ | 0 | −32.397 | −455.500 | — |
| First concave mirror 370.000 | 0 | 38.430 | −473.291 | 24.5 |
| Second concave mirror 679.810 | 0 | 0 | −500.00 | 27.6 |
| Eye Point ∞ | 0 | 0 | 0 | 0 |
| Virtual image ∞ | 0 | 0 | −830.598 | 0 |

As illustrated in Table 8, if i1+i2 is equal to 52.1, if R2/R1 is equal to 1.84, and if Yv/Yp is equal to 3.72, then the distance from the virtual image to the eye point E is equal to 830.598 mm.

TABLE 8

| i1 + i2 | 52.1 |
|---|---|
| R2/R1 | 1.84 |
| Yv/Yp | 3.72 |
| R1 | 370 |
| Virtual image to EyePoint | 830.598 |

Figure 10:
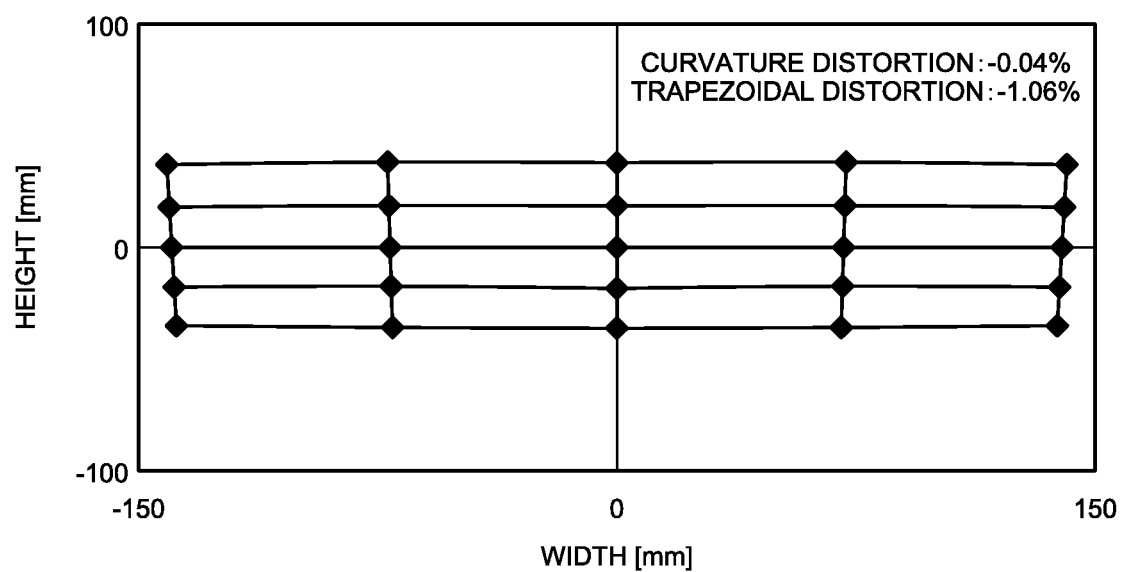
FIG. 10 is a diagram illustrating an example of the virtual image that is visually confirmed by the driver according to a fourth embodiment.

The following explanation with reference to FIG. 10 is given about the distortion according to a fourth embodiment. FIG. 10 is a diagram illustrating an example of the virtual image that is visually confirmed by the driver according to the fourth embodiment. In this case, the curvature distortion is equal to −0.04% and the trapezoidal distortion is equal to −1.06%.

First Comparative Example

As illustrated in Table 9, the curvature radius R1 of the reflecting surface 61 of the first concave mirror 6 is equal to 310.000 mm, the curvature radius R2 of the reflecting surface 71 of the second concave mirror 7 is equal to 840.889 mm, the incidence angle i1 is equal to 24.5°, and the incidence angle i2 is equal to 27.6°.

TABLE 9

| Curvature radius of each face R [mm] | Coordinates of central ray in each face | | | Incidence angle [deg] of central ray in each face |
|---|---|---|---|---|
| | X [mm] | Y [mm] | Z [mm] | |
| Display device ∞ | 0 | −32.397 | −455.500 | — |
| First concave mirror 310.000 | 0 | 38.430 | −473.291 | 24.5 |
| Second concave mirror 840.889 | 0 | 0 | −500.00 | 27.6 |
| Eye Point ∞ | 0 | 0 | 0 | 0 |
| Virtual image ∞ | 0 | 0 | −829.999 | 0 |

As illustrated in Table 10, if i1+i2 is equal to 52.1, if R2/R1 is equal to 2.71, and if Yv/Yp is equal to 3.71, then the distance from the virtual image to the eye point E is equal to 829.999 mm.

TABLE 10

| i1 + i2 | 52.1 |
|---|---|
| R2/R1 | 2.71 |
| Yv/Yp | 3.71 |
| R1 | 310.000 |
| Virtual image to EyePoint | 829.999 |

Figure 11:
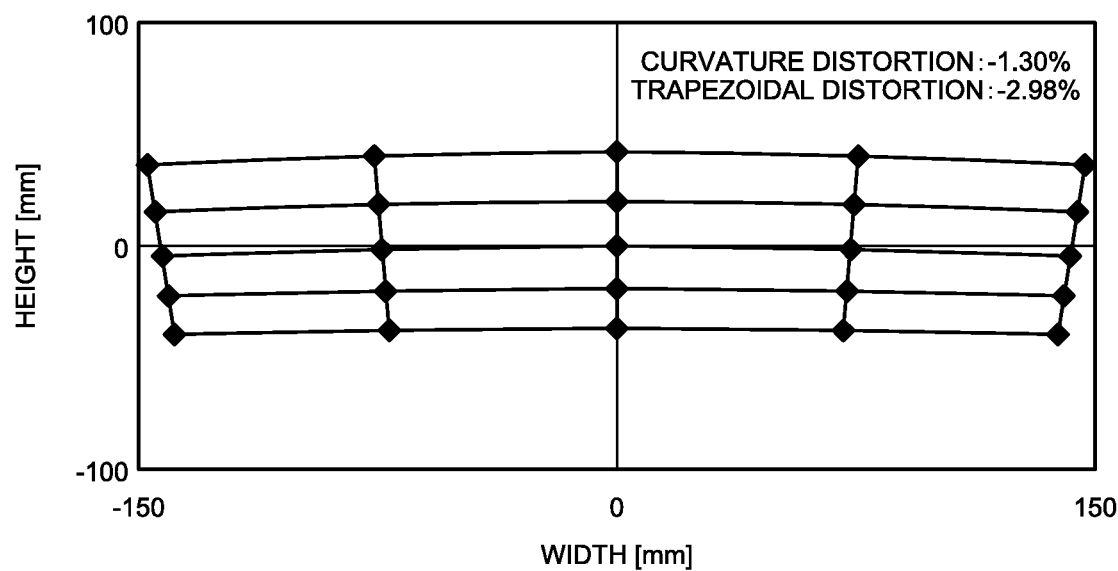
FIG. 11 is a diagram illustrating an example of the virtual image that is visually confirmed by the driver according to a first comparative example.

The following explanation with reference to FIG. 11 is given about the distortion according to a first comparative example. FIG. 11 is a diagram illustrating an example of the virtual image that is visually confirmed by the driver according to the first comparative example. In this case, the curvature distortion is equal to −1.30% and the trapezoidal distortion is equal to −2.98%. Thus, in the first comparative example, there is an increase in the curvature distortion and the trapezoidal distortion as compared to the fourth embodiment.

Second Comparative Example

As illustrated in Table 11, the curvature radius R1 of the reflecting surface 61 of the first concave mirror 6 is equal to 518.597 mm, the curvature radius R2 of the reflecting surface 71 of the second concave mirror 7 is equal to 518.597 mm, the incidence angle i1 is equal to 24.5°, and the incidence angle i2 is equal to 27.6°.

TABLE 11

| Curvature radius of each face R [mm] | Coordinates of central ray in each face | | | Incidence angle [deg] of central ray in each face |
|---|---|---|---|---|
| | X [mm] | Y [mm] | Z [mm] | |
| Display device ∞ | 0 | −32.397 | −455.500 | — |
| First concave mirror 518.597 | 0 | 38.430 | −473.291 | 24.5 |
| Second concave mirror 518.597 | 0 | 0 | −500.00 | 27.6 |
| Eye Point ∞ | 0 | 0 | 0 | 0 |
| Virtual image ∞ | 0 | 0 | −847.298 | 0 |

As illustrated in Table 11, if i1+i2 is equal to 52.1, if R2/R1 is equal to 1.00, and if Yv/Yp is equal to 3.71, then the distance from the virtual image to the eye point E is equal to 847.298 mm.

TABLE 12

| i1 + i2 | 52.1 |
|---|---|
| R2/R1 | 1.00 |
| Yv/Yp | 3.71 |
| R1 | 518.597 |
| Virtual image to EyePoint | 847.298 |

Figure 12:
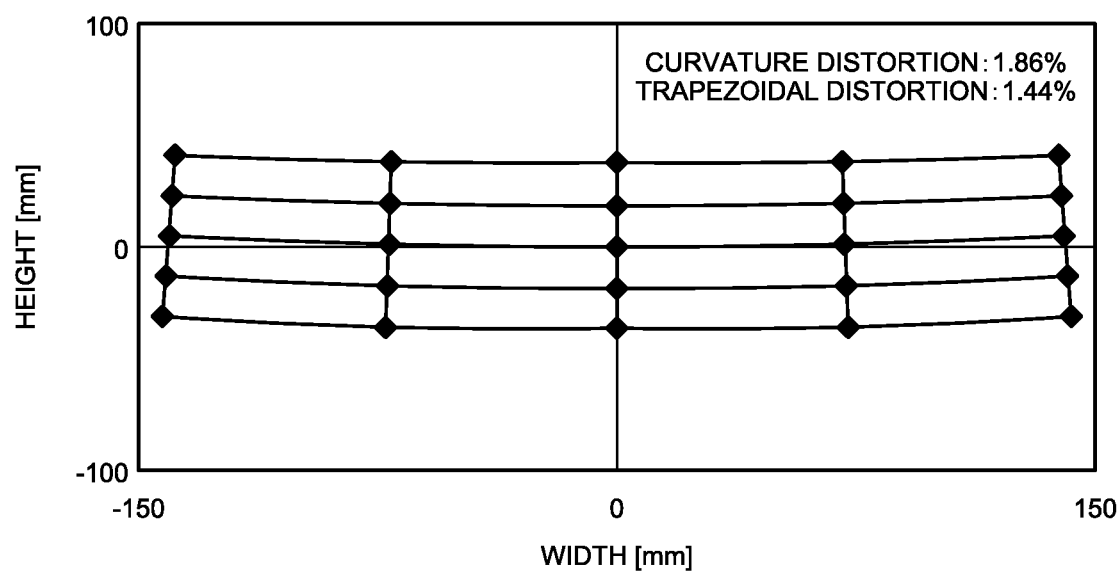
FIG. 12 is a diagram illustrating an example of the virtual image that is visually confirmed by the driver according to a second comparative example.

The following explanation with reference to FIG. 12 is given about the distortion according to a second comparative example. FIG. 12 is a diagram illustrating an example of the virtual image that is visually confirmed by the driver according to the second comparative example. In this case, the curvature distortion is equal to 1.86% and the trapezoidal distortion is equal to 1.44%. Thus, in the second comparative example, there is an increase in the curvature distortion and the trapezoidal distortion as compared to the first to fourth embodiments.

As described above, in the embodiments, as a result of arranging two concave mirrors, namely, the first concave mirror 6 and the second concave mirror 7, the light path in the housing 10 is secured in the vertical direction. As a result, in the embodiments, the optical axis A2 that joins the eye point E of the driver and the virtual image in a depth direction of the housing 10 can be shortened in length, thereby enabling achieving downsizing of the housing 10.

Figure 13:
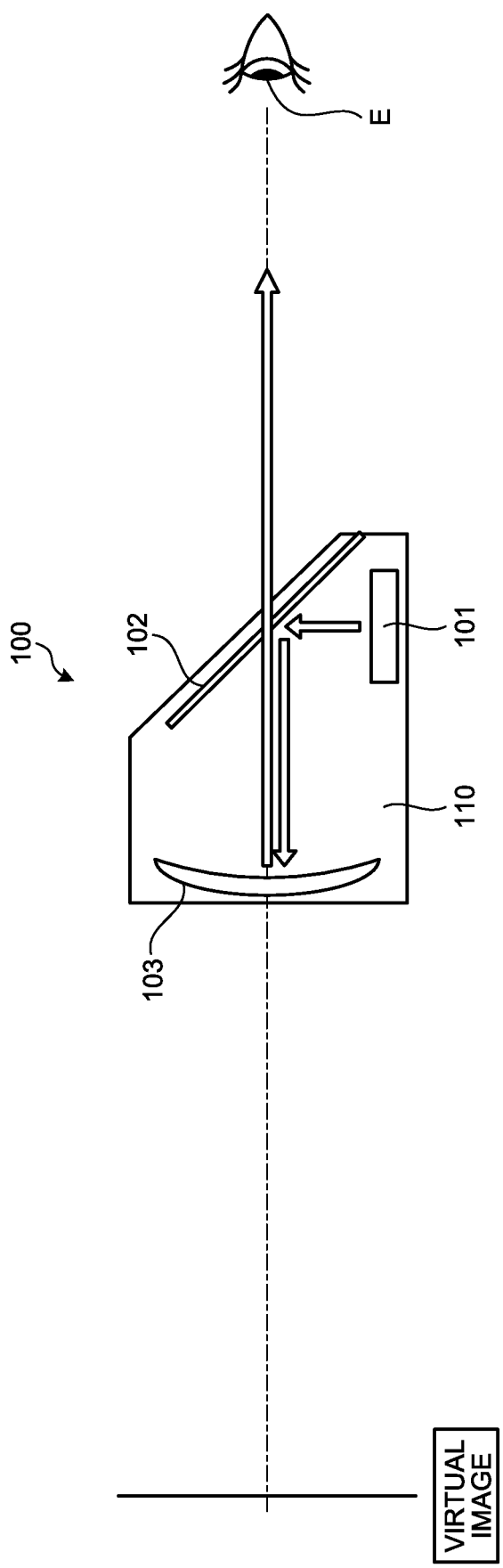
FIG. 13 is an overall diagram of an exemplary configuration of a conventional vehicle display device.
Figure 14:
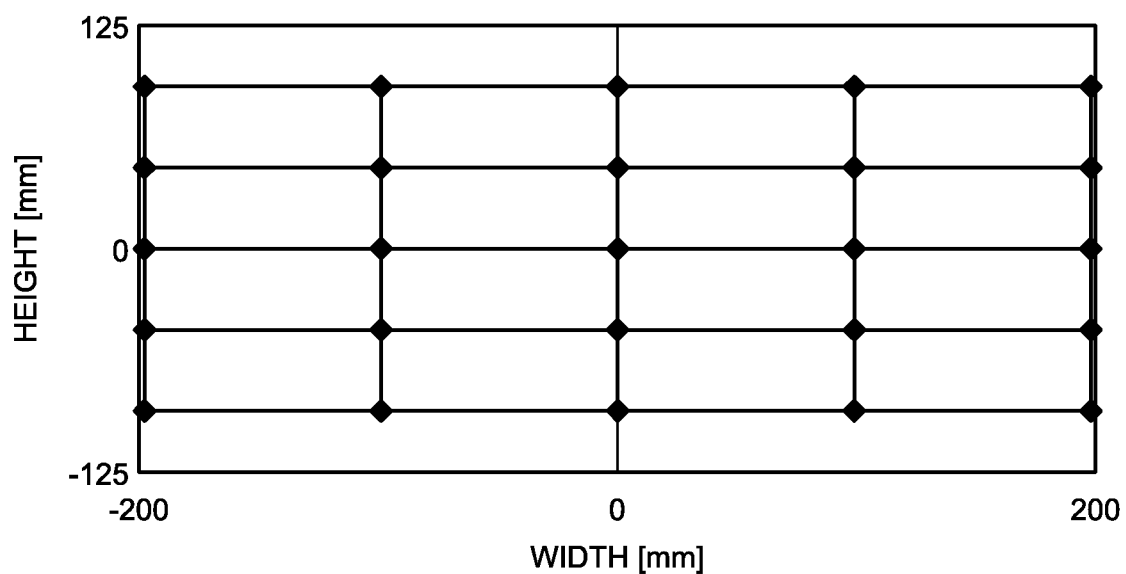
FIG. 14 is a diagram illustrating an example of a virtual image that is visually confirmed by the driver with the conventional vehicle display device.

In contrast, explained below with reference to FIGS. 13 and 14 is a vehicle display device 100 that includes a single concave mirror 103. FIG. 13 is an overall diagram of an exemplary configuration of the conventional vehicle display device. FIG. 14 is a diagram illustrating an example of the virtual image that is visually confirmed by the driver with the conventional vehicle display device. The vehicle display device 100 includes a display 101, a half mirror 102, and the concave mirror 103. The light emitted in the display 101 reflects on the half mirror 102 and falls on the concave mirror 103. Then, the incident light on the concave mirror 103 is reflected toward the half mirror 102. Subsequently, the incident light on the half mirror 102 passes through the half mirror 102 and reaches the driver. As illustrated in FIG. 14, in the vehicle display device 100, the distortion of the virtual image is suppressed. However, as illustrated in FIG. 13, since the light path in a housing 110 cannot be secured in the vertical direction, the length in the depth direction of the housing 110 increases, thereby resulting in an increase in the size of the housing 110.

In the embodiments, as a result of using two concave mirrors, namely, the first concave mirror 6 and the second concave mirror 7, it becomes possible to share and reduce the influence of aberration occurring by reflection in the optical system. Thus, according to the embodiments, it becomes possible to reduce the distortion.

Moreover, in the embodiments, as a result of satisfying the conditions (i) to (v), it becomes possible to achieve downsizing of the housing 10 and to suppress the occurrence of distortion.

In the embodiments, as a result of satisfying the condition (i), it becomes possible to successfully correct the optical distortion in the virtual image that is visually confirmed by the driver. In the embodiments, when R2/R1 satisfies the lower limit of the condition (i) and R1 and R2 satisfy R1≤R2, the curvature distortion can be suppressed. Moreover, in the embodiments, since R2/R1 satisfies the upper limit of the condition (i), the trapezoidal distortion can be suppressed.

In the embodiments, as a result of satisfying the condition (ii), the entire vehicle display device 4, that is, the housing 10 can be downsized, and it becomes possible to suppress the deterioration in the image quality due to the inclined incidence of light on the first concave mirror 6 and the second concave mirror 7. In the embodiments, since i1+i2 satisfies the lower limit of the condition (ii), it becomes possible to downsize the vehicle display device 4. Moreover, in the embodiments, since i1+i2 satisfies the upper limit of the condition (ii), it becomes possible to suppress the aberration due to the first concave mirror 6 and the second concave mirror 7.

In the embodiments, as a result of satisfying the conditions (iii) and (iv), the aberration can be successfully corrected while achieving downsizing of the entire optical system. In the embodiments, since the curvature radius R1 satisfies the lower limit of the condition (iii), it becomes possible to suppress the aberration and to reduce the fluctuation in the image quality due to the error of the optical components. In the embodiments, since the curvature radius R1 satisfies the upper limit of the condition (iii), it becomes possible to suppress the sectorial distortion.

In the embodiments, the display surface 51 of the display 5 is disposed to be inclined with respect to the central ray that falls on the first concave mirror 6 from the display surface 51. According to the embodiments, when the sunlight falls on the vehicle display device 4 from behind, ray of the sun reflected from the first concave mirror 6 and the second concave mirror 7 fall on the display surface 51. However, the display surface 51 reflects some of the incident light in a different direction from the direction of incidence, the reflected light does not reach the driver as an optical feedback. As a result, it becomes possible to suppress a deterioration in the visibility of the displayed images due to the optical feedback.

In contrast, if the display surface 51 of the display 5 is disposed to be orthogonal to the central ray that falls on the first concave mirror 6 from the display surface 51, the ray of the sun falling on the vehicle display device 4 from behind fall on the display surface 51 and get partially reflected. Then, the reflected light travels the light path of incidence in the opposite direction, gets reflected on the second concave mirror 7 and on the first concave mirror 6 in this order, passes through the half mirror 8, and reaches the driver as the optical feedback. That may result in the deterioration in the visibility of the displayed images.

The constituent elements described above include constituent elements that may easily occur to one skilled in the art and include equivalent constituent elements. Moreover, the constituent elements described above can be appropriately combined. Furthermore, the present application is to be construed as embodying various deletions, alternative constructions, and comparatives that may occur to one skilled in the art that fairly fall within the basic teaching herein set forth.

Meanwhile, the half mirror 8 can be substituted with a glass plate that includes a polarizer having identical functions to the half mirror 8.

Moreover, the display 5, the half mirror 8, the first concave mirror 6, the second concave mirror 7, and the housing 10 can be installed to be embedded as an optical unit in a front ceiling or a dashboard of the vehicle.

According to the present application, it becomes possible to suppress the occurrence of distortion even with a compact configuration.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
a display configured to display a video;
a first concave mirror having a reflecting surface formed in a concave shape configured to reflect the video displayed in the display; and
a second concave mirror having a reflecting surface formed in a concave shape configured to reflect the video reflected on the first concave mirror, wherein
a display surface of the display is positioned within a composite focal length of the first concave mirror and the second concave mirror;
a distance from eye point of occupant of vehicle to a reflecting image formed by the second concave mirror is optically extended such that it becomes longer than a distance from the eye point of the occupant to a display surface of the display; and
R1 and R2 satisfy $1.1<R2/R1<2$ wherein R1 represents a curvature radius of the reflecting surface of the first concave mirror and R2 represents a curvature radius of the reflecting surface of the second concave mirror; and at least one of conditions:

i1 and i2 satisfy $30° \leq i1+i2 \leq 70°$ wherein i1 represents an incidence angle of central ray from the display onto the first concave mirror and i2 represents an incidence angle of central ray from the first concave mirror onto the second concave mirror;

R1 satisfies 300 mm $\leq$ R1 $\leq$ =600 mm; and

Yv and Yp satisfy $1 < Yv/Yp < 10$ wherein Yv represents a magnitude in a vertical direction of the video that is visually confirmed by the occupant and Yp represents a magnitude in a height direction of the video, corresponding to the vertical direction of the virtual image displayed on the display surface;

is satisfied.

2. The vehicle display device according to claim 1, wherein the display surface is disposed to be oriented upward and along a direction parallel to optical axis from the second concave mirror toward the eye point of the occupant, and is disposed to be inclined with respect to a central ray that falls on the first concave mirror from the display surface.

3. A vehicle display system comprising:

the vehicle display device according to claim 1;

a rear camera that captures rear side of the vehicle; and a controller that obtains a video taken by the rear camera and displays the video in the display device.

* * * * *